Feb. 3, 1959          R. E. DE YOUNG          2,872,599
WINDING INSULATOR FOR ELECTRIC MOTOR
Filed March 1, 1957
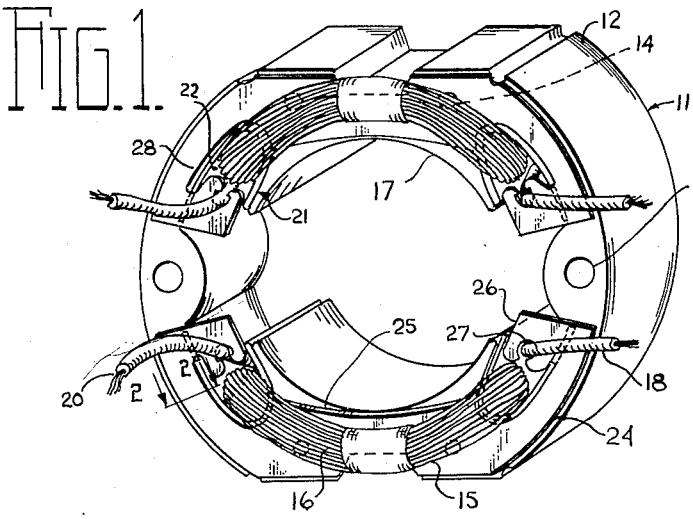
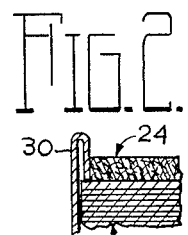
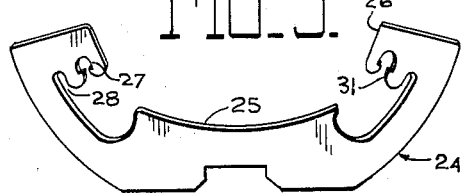
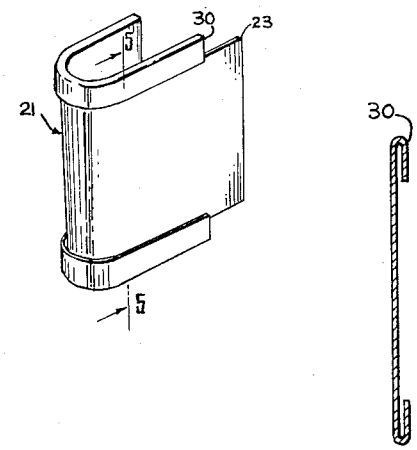
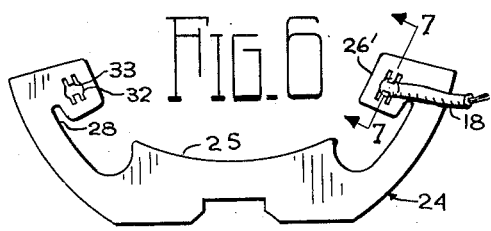
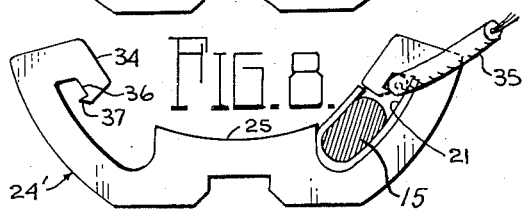
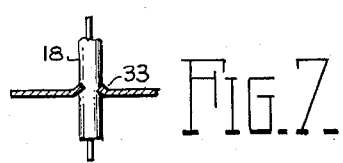
INVENTOR.
Roger E. DeYoung
BY
*Oren & Oren*
ATTORNEYS United States Patent Office 2,872,599
Patented Feb. 3, 1959

2,872,599

WINDING INSULATOR FOR ELECTRIC MOTOR

Roger E. De Young, Toledo, Ohio, assignor to American Electric Motors, Inc., Toledo, Ohio, a corporation of Ohio Application March 1, 1957, Serial No. 643,445

6 Claims. (Cl. 310—71)

This invention pertains to electric motor stators and more specifically to a means for anchoring the lead wires of a stator coil of the type in which the coils are wound in place.

The conventional method of manufacturing stator coils consists of winding the wire of which the coil is made on a form whose shape corresponds to the shape desired for the coil when positioned within the field laminations forming the body of the stator. After the relatively stiff wire is thereby formed, flexible leads are attached to the ends and taped securely to the sides of the formed coil. The coil is then inserted in proper position in the field laminations and held by fiber or wooden wedges or metal straps.

More recently, it has been found less expensive to wind the coils in place directly within the stator body around integral magnetic poles forming a part of the stator laminations. This eliminates the previously necessary coil forms and also the additional labor required to position the formed coil in the stator body. This method now constitutes the prevalent manufacturing practice where economy of manufacture of small motors is important. The new method, however, prevents the lead wires from being taped around the coil as in the former practice since the coil is already in place when the lead wires are connected. Consequently, in one recent method of procedure the wires are anchored by means of a metal strap securing the lead wires to that portion of the coil extending beyond the ends of the stator body and from side to side of the pole. The thickness of the metal strap and insulated lead wire are added to the length of the coil as measured between its extremities extending beyond the stator body. The added length may require the motor housing to be longer, which is a disadvantage particularly for small appliances and the like where compactness is a prime consideration. Further the metal strap increases the danger of short circuiting a field coil in the event that the insulation of the strap and coil is destroyed by chaffing or the like.

An alternate method of anchoring the lead wires consists of string-tying the lead wires to the coil near the point where it extends beyond the stator body. The length of the coil is not increased by this method since no projection is added to the extremities of the coil. However, the method is time consuming and is therefore relatively expensive. It also requires considerable training of the factory personnel and considerable time for the attainment of top efficiency in the operation, since the placement of the tying string and the exact manner of making and placing the knots therein requires great dexterity.

The primary object of the present invention is to provide means for anchoring lead wires in a stator coil which overcomes the above and other disadvantages and which is simple and effective in its operation.

It is another object of the invention to combine means for anchoring the wires with means for insulating the extremities of the coil from the end field laminations, as will subsequently appear.

Other objects and advantages of the invention will become apparent from the following detailed description of a preferred embodiment thereof, reference being had to the accompanying drawings, in which—

Fig. 1 is an isometric view of a completed stator for an electric motor embodying the invention;

Fig. 2 is a detailed, cross-sectional view on line 2—2 of Fig. 1;

Fig. 3 is a detailed view of a portion of the apparatus of Fig. 1;

Fig. 4 is a detailed view of an insulating insert used with the apparatus of Fig. 1;

Fig. 5 is a cross-sectional view on line 5—5 of Fig. 4;

Figs. 6 and 7 are detailed views of a modified form of the apparatus of Fig. 3; and Fig. 8 is another modification of the apparatus of Fig. 3.

Referring to the drawings, a stator body 11 comprises the usual stack of field laminations 12 aligned by holes 13 and connected by means of pins 14. Each field coil 15 comprises a coated magnet wire 16 which is wound in place about integral field pole extensions 17 which protrude radially inward from the body of the laminations to form magnetic pole faces to cooperate with the usual motor armature (not shown). Lead wires 18 and 20 are connected to ends of the coated magnet wire 16 and to a source of current and the armature brush.

Insulating cuffs 21 are placed in grooves 22 before the coil is wound. This prevents contact between the coated wire and the field laminations which decreases the possibility of short circuits should any of the wire be bared through wear, chipping, or imperfection in manufacture. Each cuff includes a recessed portion 23 and a collar portion 30, the purpose of which will subsequently appear.

A stiff end fiber 24 is located adjacent the end laminations of the stator body and is made generally of the same contour as a half of the lamination which it covers. The fiber piece contains a first projection 25, centrally located and two end projections 26, all of which extend inwardly from the main portion. In the preferred form, the end projections each contain a circumferential opening or notch 27 by means of which lead wires 18 and 20 are secured. A slot 28 is also located between a portion of each end projection and the main body of the end fiber, and portion 30 of the cuff 21 is received in the slot when the fiber is assembled as hereinafter described. The end fiber is thus prevented, by projection 25 which abuts the cuff-protected field coil, and by slot 28 coacting with portion 30 of cuff 21, from moving either circumferentially or radially.

The end fiber is positioned after the coil is wound in place by inserting projection 25 between the projecting ends of the cuff-protected coil and the end field lamination. Projections 26 thus lie close to the sides of the coil but out of contact with it. The end fiber is then snapped down with collar portions 30 of cuffs 21 extending through slots 28. In practice, collar portions 30 of the cuffs extend outwardly about ⅛ inch beyond the cuff portions 23 which are flush with the end laminations. After the end fiber has been positioned, the lead wires are anchored in openings 27 by being manually pressed into place. It is only necessary for the operator to grasp the wire and pull it sideways away from the coil body to force it into the opening or slot 27. Barbs 31 are provided to prevent the inserted wires from being displaced outwardly of the openings 27, and the slots or openings are made of such size as to coincide rather closely with the diameter of the wires so that the wire is functionally held in the opening. Most of the lead wires now in use are insulated with a somewhat compressible covering so that a good frictional grip on the wire can be obtained.

Finally the outer ends of the coil are formed down against the end fiber which reduces the length of the coil and also assists in maintaining the end fiber securely in place. With projection 25 of the end fiber being between the end of the coil and the end field lamination, the end fiber also serves an insulating function as is known in the art.

A similar end fiber is used at the opposite end of the stator body with the exception that projections 26 containing notches 27 is unnecessary since there are no lead wires to be anchored at this end. The fiber thus served solely as an insulator for the coil.

Other means of anchoring the wire in the projections 26 may be employed within the scope of the present invention. A first modified form is shown in Figs. 6 and 7 in which the anchoring slots 27 are replaced by holes 32 in projections 26' through which the lead wire is threaded. The wire may be secured in the hole in any suitable manner as by a fiber finger 33 which may be struck up from the fiber to bear against the wire to prevent it from moving backwards through the hole 32. Obviously other anchoring means for the wire will suggest themselves to those skilled in the art.

A further modification of the end fiber is shown in Fig. 8. This fiber has particular adaptability for smaller motors, since it affords greater compactness. According to this modification, end fiber 24' has the usual projection 25 with projections 34 replacing projections 26 and 26'. These modified projections combine the function of holes or notches 27 or 32 with that of the previously described slots 28. Thus, after the end fiber is positioned with respect to cuff 21, the lead wires, as wire 35, are forced into slots 36 between the cuff and the inner edge of the slot. Barbs 37 may be provided to assist in holding the wire against returning out of the slot. The radial extent of projection 34 of this end fiber can be substantially less than that of projections 26 or 26' in which the wire-holding slot and cuff-receiving slot are separate.

The invention thus basically comprises an end fiber whose general shape conforms to the field laminations and which contains inwardly extending projections having some provision such as notches or openings in which the lead wires are anchored by a simple threading movement. Means are also included for preventing radial and circumferential movement of the end fiber.

In many instances small electric motors in which the invention has been found useful are produced under a warranty provision, the warranty being voided if the purchaser tampers in any way with the motor windings. The present invention lends itself well to production of this nature since provision can readily be made to determine whether or not the lead wires have been removed from the notches or openings 27 into which they were inserted at the factory. It has been found that a small quantity of a sealing liquid which cures under atmospheric conditions into a rubber-like substance can be placed on the end fiber adjacent the lead wire and will adhere to both. The seal thus formed will remain intact during all normal operation of the motor but will be broken in the event that the user ever removes the lead wire from the notch or opening 27. The presence of the sealing compound, while it assists in retaining the lead wire in the notch or opening 27, does not alter the fact that initially, at least, the lead wire is frictionally secured in said opening.

The foregoing description has been intended to serve in an illustrative and not a limiting sense, the scope of the invention being limited only by the appended claims.

What I claim is:

1. Means for anchoring the lead wires of a stator for an electric motor having a coil, lead wires connected to said coil, and field laminations forming a stator body, said means comprising, an end fiber shaped to conform generally with a portion of the field laminations, and having at least one end projection projecting radially inwardly, said end portion containing an opening adapted to frictionally secure a lead wire, means for preventing circumferential movement of said end fiber with respect to said field laminations, and means for preventing radial movement of said end fiber with respect to said field laminations.

2. A stator for an electric motor comprising a plurality of field laminations forming a stator body and inwardly extending magnetic poles, a coil wound around each pole, said coil extending beyond the ends of said body, a lead wire connected to the ends of the wire forming each coil and extending outwardly beyond an end of said stator body, an end fiber for each coil having a shape which conforms generally to the shape of a portion of a field lamination, said end fiber being located adjacent an end of said body with a portion of said end fiber projecting radially inwardly from said stator body and beneath an extended portion of a coil, and a projection on said end fiber extending radially inwardly outside the coil, said second projection containing an opening in which said lead wire is anchored.

3. A stator for an electric motor comprising a plurality of field laminations forming a stator body and inwardly extending magnetic poles, a coil wound around each pole, said coil extending beyond the ends of said body, a lead wire connected to the ends of the wire forming each coil and extending outwardly beyond an end of said stator body, an end fiber corresponding to each coil having a shape which conforms generally to the shape of a portion of a field lamination, said end fiber being located adjacent an end of said body with a portion of said end fiber projecting radially inwardly from said stator body and beneath the extended portion of the coils, a second projection on said end fiber extending radially inwardly outside the coil, said second projection containing a generally circumferential slot in which said lead wire is frictionally anchored, and means for preventing circumferential movement of said end fiber.

4. A stator for an electric motor comprising a plurality of field laminations forming a stator body and inwardly extending magnetic poles, a coil wound around each pole, said coil extending beyond the ends of said body, a lead wire connected to the ends of the wire forming each coil and extending outwardly beyond an end of said stator body, an end fiber corresponding to each coil having a shape which conforms generally to the shape of a portion of a field lamination, said end fiber being located adjacent an end of said body with a portion of said end fiber projecting radially inwardly from said stator body and beneath the extended portion of the coils, a second projection on said end fiber extending radially inwardly outside the coil, said second projection containing a generally circumferential slot in which said lead wire is frictionally anchored, barbs formed adjacent said slot to prevent outward movement of an anchored wire, and means for preventing circumferential movement of said end fiber.

5. A stator assembly for an electric motor comprising a plurality of field laminations forming a stator body and inwardly extending magnetic poles, a coil wound around each pole, said coil extending beyond the ends of said body, a lead wire connected to the ends of the wire forming each coil and extending outwardly beyond an end of said stator body, an insulating fiber cuff separating that portion of each coil within the stator body from the field laminations, a portion of each cuff extending beyond the ends of the stator body, an end fiber corresponding to each coil having a shape which conforms generally to the shape of a portion of a field lamination, said end fiber being located adjacent an end of said body with a portion of said end fiber projecting radially inwardly from said stator body and beneath an extending portion of a coil, and a second projection on said end fiber extending radially inwardly outside the coil, said second projection having an opening in which a lead wire is anchored and a groove in which the extended portion of said cuff is received to prevent circumferential and radial movement of said end fiber.

6. A stator assembly for an electric motor comprising a plurality of field laminations forming a stator body and inwardly extending magnetic poles, a coil wound around each pole, said coil extending beyond the ends of said body, a lead wire connected to the ends of the wire forming each coil and extending outwardly beyond an end of said stator body, an insulating fiber cuff separating that portion of each coil within the stator body from the field laminations, a portion of each cuff extending beyond the ends of the stator body, an end fiber corresponding to each coil having a shape which conforms generally to the shape of a portion of a field lamination, said end fiber being located adjacent an end of said body with a portion of said end fiber projecting radially inwardly from said stator body and beneath an extending portion of a coil, and a second projection on said end fiber extending radially inwardly outside the coil, said second projection having a generally circumferential slot in which a lead wire is frictionally anchored and a groove in which the extended portion of said cuff is received to prevent circumferential and radial movement of said end fiber.

References Cited in the file of this patent

UNITED STATES PATENTS

| | | |
|---|---|---|
| 1,743,860 | Meunier | Jan. 14, 1930 |
| 2,253,191 | Morrill | Aug. 19, 1941 |
| 2,627,584 | Schultz | Feb. 3, 1953 |
| 2,631,251 | Spielman | Mar. 10, 1953 |